US008640132B2

(12) United States Patent
Berstis et al.

(10) Patent No.: US 8,640,132 B2
(45) Date of Patent: Jan. 28, 2014

(54) JOBSTREAM PLANNER CONSIDERING NETWORK CONTENTION AND RESOURCE AVAILABILITY

(75) Inventors: Viktors Berstis, Austin, TX (US); Kyle Boon, Columbus, OH (US); Creighton M. Hicks, Austin, TX (US); Bella Voldman, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1497 days.

(21) Appl. No.: 12/141,443

(22) Filed: Jun. 18, 2008

(65) Prior Publication Data

US 2008/0250420 A1 Oct. 9, 2008

Related U.S. Application Data

(63) Continuation of application No. 11/086,716, filed on Mar. 22, 2005, now Pat. No. 7,406,689.

(51) Int. Cl.
*G06F 9/46* (2006.01)

(52) U.S. Cl.
USPC ............................ 718/102; 718/103; 718/104

(58) Field of Classification Search
USPC .......................................... 718/102, 103, 104
See application file for complete search history.

(56) References Cited

U.S. PATENT DOCUMENTS

| 6,065,063 | A | 5/2000 | Abali | 709/242 |
|---|---|---|---|---|
| 6,067,412 | A | 5/2000 | Blake et al. | 395/672 |
| 6,505,249 | B1 | 1/2003 | Rehkopf | 709/224 |
| 6,594,624 | B1 | 7/2003 | Curet | 703/2 |
| 7,010,596 | B2 | 3/2006 | Bantz et al. | |
| 7,165,252 | B1 | 1/2007 | Xu | |
| 7,219,347 | B1 | 5/2007 | Waddington | |
| 7,360,216 | B2 | 4/2008 | Spoltmore et al. | |
| 7,406,689 | B2 | 7/2008 | Berstis et al. | |
| 7,461,166 | B2 | 12/2008 | Doyle et al. | |
| 7,693,847 | B1* | 4/2010 | Brown et al. | 707/694 |
| 7,805,509 | B2 | 9/2010 | Alon et al. | |
| 7,921,130 | B2 | 4/2011 | Hinshaw et al. | |
| 7,984,441 | B2 | 7/2011 | Briccarello et al. | |
| 8,434,086 | B2 | 4/2013 | Dodge et al. | |
| 2004/0003077 | A1 | 1/2004 | Bantz et al. | 709/224 |
| 2004/0167959 | A1 | 8/2004 | Doyle et al. | 709/203 |
| 2006/0015512 | A1* | 1/2006 | Alon et al. | 707/100 |
| 2009/0132475 | A1* | 5/2009 | Hinshaw et al. | 707/2 |

OTHER PUBLICATIONS

IBM, "Comprehensive workload management for your enterprise computing environment with IBM Tivoli Workload Scheduler," Jun. 2002 (last visited Sep. 30, 2004).
IBM, "New To Grid Computing", (last visited Oct. 1, 2004).
Pool, Robert "When easy math turns hard", (last visited Oct. 1, 2004).
IBM Software, "Workload Management", (last visited Sep. 30, 2004).
IBM Software, "IBM Tivoli Workload Scheduler", Jul. 23, 2004, (last visited Sep. 30, 2004).
Notice of Allowance dated Jun. 13, 2008 regarding U.S. Appl. No. 11/086,716, 13 pages.

* cited by examiner

*Primary Examiner* — Andy Ho
(74) *Attorney, Agent, or Firm* — Yee & Associates, P.C.; Arthur Samodovitz

(57) ABSTRACT

Disclosed is a computer-implemented planning process that aids a system administrator in the task of creating a job schedule. The process treats enterprise computing resources as a grid of resources, which provides greater flexibility in assigning resources to jobs. During the planning process, an administrator or other user, or software, builds a job-dependency tree. Jobs are then ranked according to priority, pickiness, and network centricity. Difficult and problematic jobs then are assigned resources and scheduled first, with less difficult jobs assigned resources and scheduled afterwards. The resources assigned to the most problematic jobs then are changed iteratively to determine if the plan improves. This iterative approach not only increases the efficiency of the original job schedule, but also allows the planning process to react and adapt to new, ad-hoc jobs, as well as unexpected interruptions in resource availability.

27 Claims, 3 Drawing Sheets

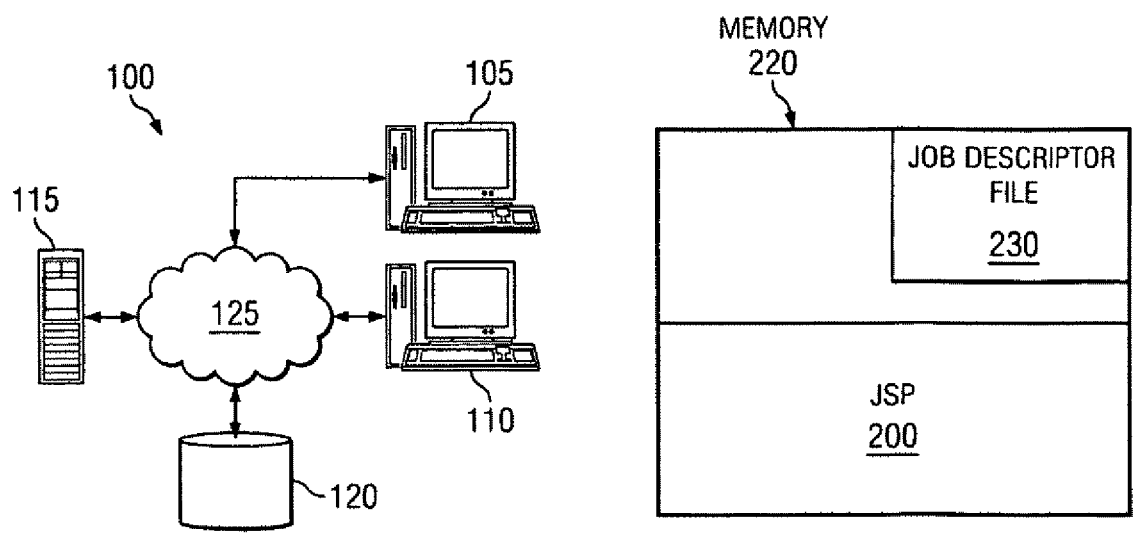
FIG. 1
*(PRIOR ART)*
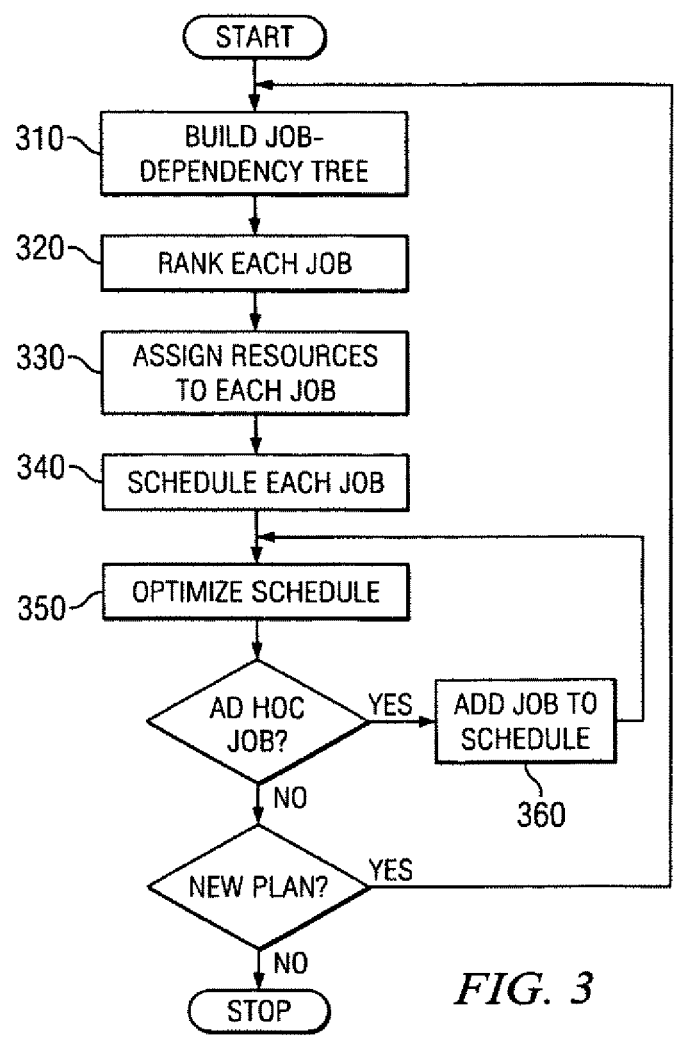
FIG. 2
FIG. 3

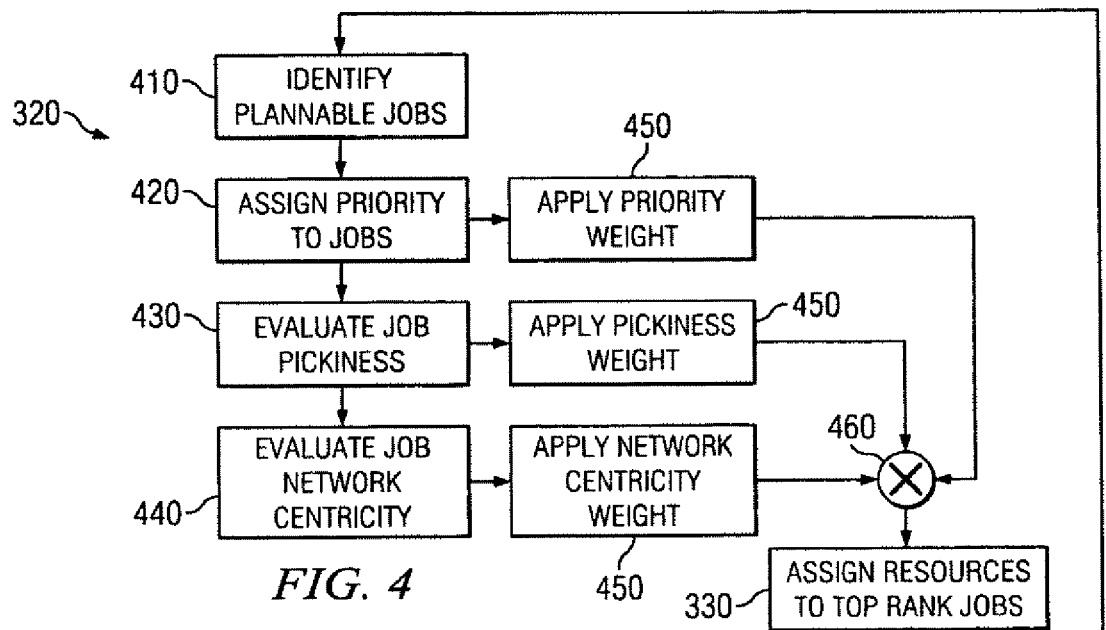
FIG. 4
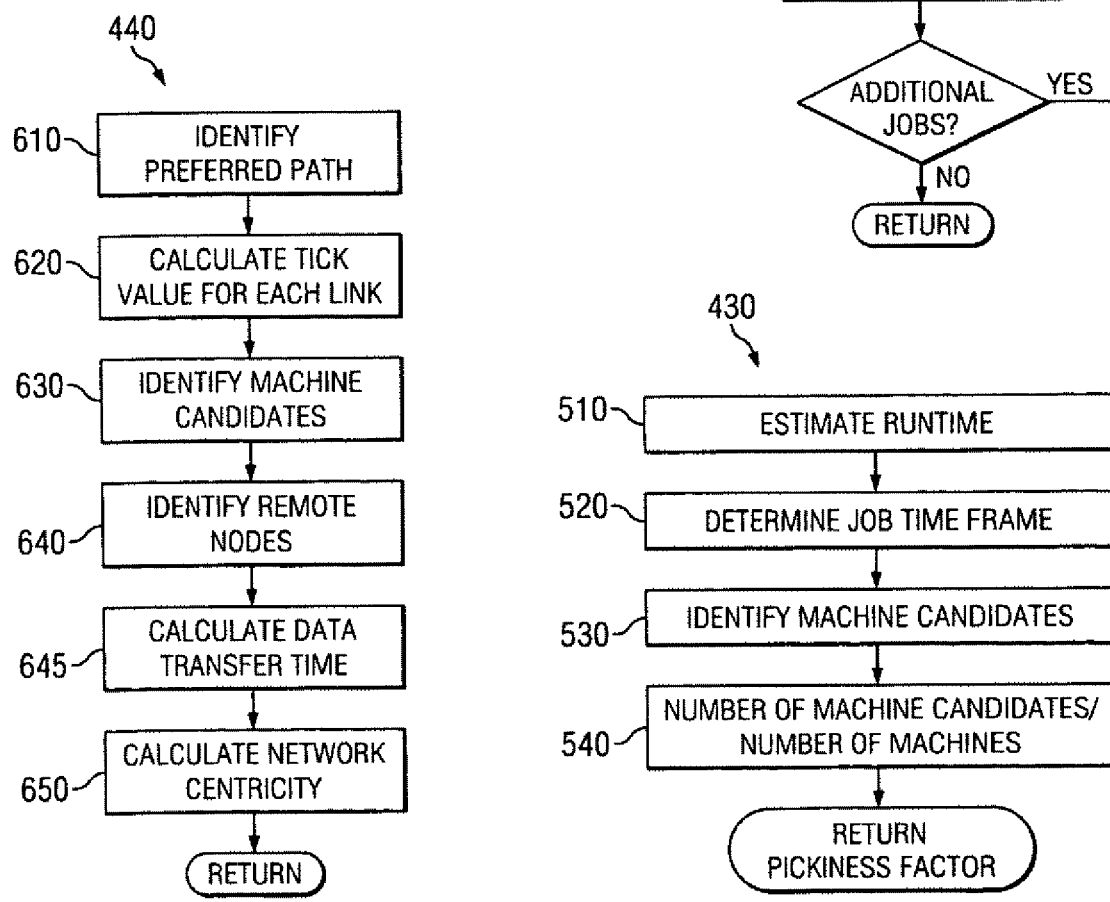
FIG. 6
FIG. 5

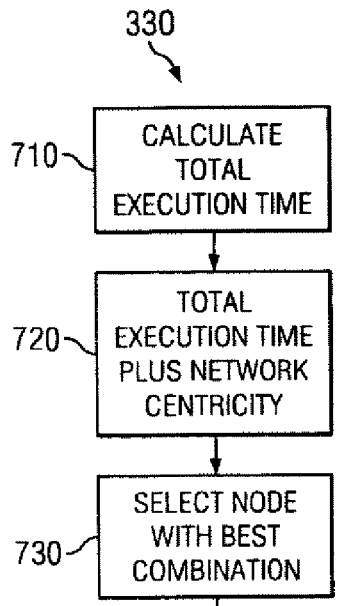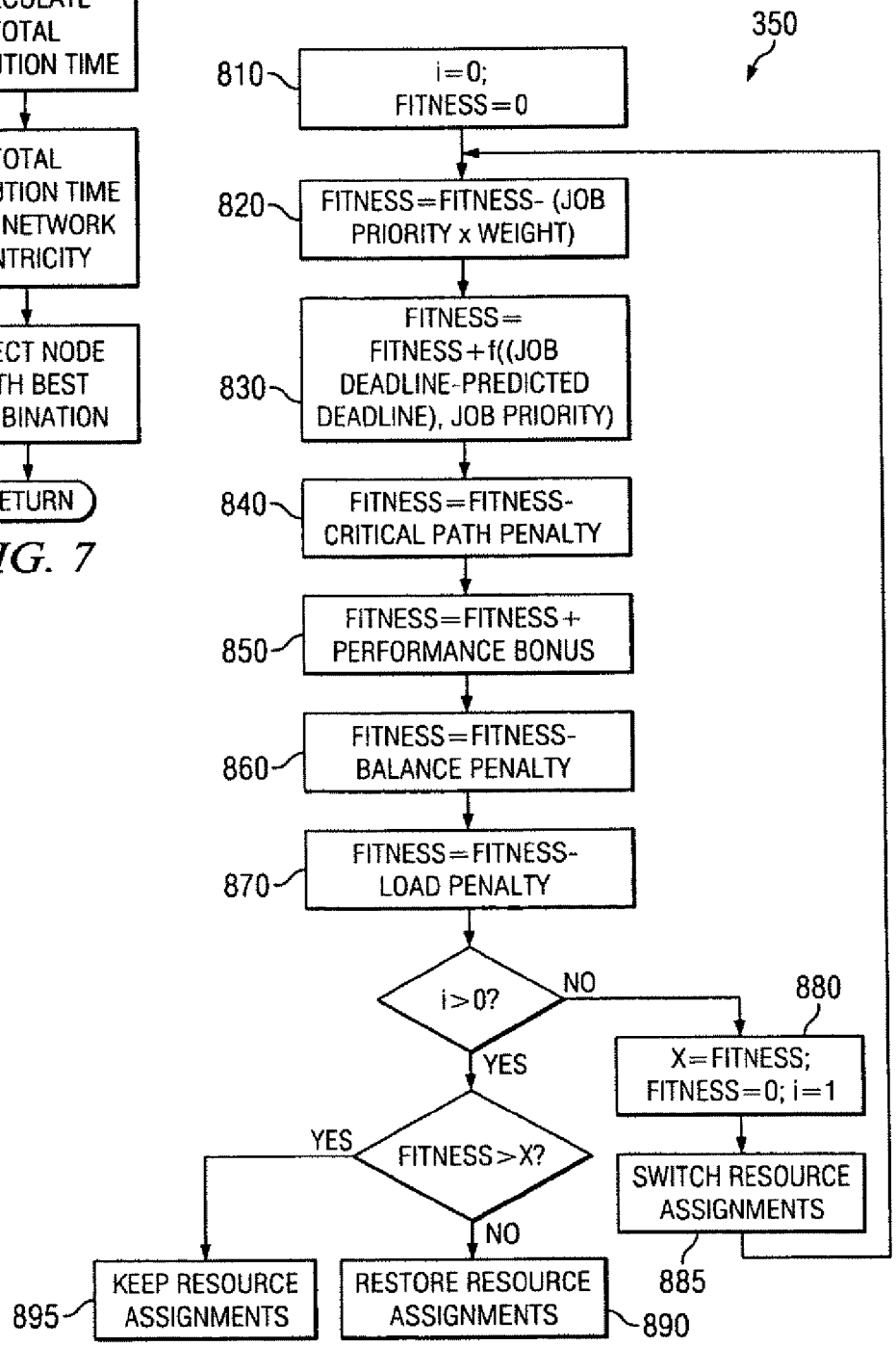
FIG. 7
FIG. 8

JOBSTREAM PLANNER CONSIDERING NETWORK CONTENTION AND RESOURCE AVAILABILITY

RELATED APPLICATIONS

This application is a continuation of U.S. patent application Ser. No. 11/086,716 filed Mar. 22, 2005, granted as U.S. Pat. No. 7,406,689, issued on Jul. 29, 2008 and claims priority therefrom.

FIELD OF THE INVENTION

The invention described below is directed generally to a method and corresponding apparatus for administering job execution in a digital data processing system, and specifically to means for scheduling multiple jobs considering network contention and resource availability.

BACKGROUND OF THE INVENTION

Widely distributed, "open" network computer resources are the norm in contemporary enterprise network environments. International Business Machines Corp., *Comprehensive workload management for your enterprise computing environment with IBM Tivoli Workload Scheduler* (Jun. 2002). These resources typically include a wide variety of software, desktop computers, network hardware, and servers, each with specific requirements and functions. Id.

Generally, a system administrator is responsible for managing the workload on computing resources in such an enterprise computing system. Among other things, the system administrator must create a schedule for executing multiple programs, and then implement the schedule by dispatching the work in accordance with the schedule. In generic terms, a group of programs that should be executed in a prescribed sequence is known as a "batch job," or just a "job."

Systems administrators are in a unique position to understand the extraordinary batch workload demands created when key business processes are automated. Id. With the addition of each new automated process, the batch workload can grow at an incredible rate. Often, there is a potential for daily batch processing workloads to triple or even quadruple in several years. At the same time, the window for processing jobs is shrinking, with many critical jobs needing to be completed before each day's regular online work begins. Id.

The workload management challenge can be complicated further by interdependencies between jobs and the availability of personnel who understand how to manage batch jobs in the context of important business priorities. Consider, for example, the requirements that can be triggered when a customer places an order over the Internet. Depending on the environment, the customer's request could initiate a job on a UNIX server to acknowledge the order, a second job on an IBM AS/400 ISERIES server to order parts, a third job on an OS/390 ZSERIES server to debit the customer's bank account or payment system, and yet another job on a MICROSOFT WINDOWS NT server to print a docket and address labels. If any job fails, the company's revenues and customer satisfaction might be at risk. See id.

Because batch workloads provide the raw material for many of today's automated business processes, it is more important than ever for systems administrators to have an efficient, reliable and scalable way to manage their batch workloads seamlessly in a distributed environment. Id. Historically, though, a system administrator manually creates a schedule for executing jobs (the "job stream"), and designates fixed resources for each job. Fortunately, job scheduling programs, such as IBM's Tivoli Workload Scheduler, monitor and control the workload in an enterprise computing system, thereby facilitating the system administrator's workload management tasks to some extent. See, generally, International Business Machines Corp., *IBM Tivoli Workload Scheduler* (Jul. 23, 2004). Tivoli Workload Scheduler is an example of a jobstream "dispatcher" specifically designed to help a system administrator manage workloads in a complex, distributed environment. IBM I, supra. A jobstream dispatcher provides consistent and reliable operations by giving a system administrator the ability to use a single console to execute a previously planned job schedule using many varied resources across an enterprise. See id. Conventional jobstream planning involves preparing jobs for automatic execution, resolving interdependencies, and then assigning resources for executing the jobs. See id. If a particular job fails, conventional job scheduling programs often can handle the recovery process with little or no operator intervention. Id.

Currently, though, neither a system administrator nor any conventional jobstream planner can account for the possibility that one job stream may interfere with another. In particular, conventional jobstream planners do not account for a jobstream's network use, which may cause delays and inefficient resource utilization. Moreover, conventional jobstream planners do not provide any means for adding ad-hoc jobs to a jobstream without causing additional interference. A novel jobstream planning process and corresponding apparatus that address these needs is described in detail below.

SUMMARY OF THE INVENTION

The invention described in detail below is a computer-implemented planning process that aids a system administrator in the task of creating a job schedule. The process treats enterprise computing resources as a grid of resources, which provides greater flexibility in assigning resources to jobs. During the planning process, an administrator, other user, or software, builds a job-dependency tree. Jobs are then ranked according to priority, pickiness, and network centricity. Difficult and problematic jobs then are assigned resources and scheduled first, with less difficult jobs to schedule assigned resources and scheduled afterwards. The resources assigned to the most problematic jobs then are changed iteratively to determine if the plan improves. This iterative approach not only increases the efficiency of the original job schedule, but also allows the planning process to react and adapt to new, ad-hoc jobs, as well as unexpected interruptions in resource availability.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 1 represents a prior art, exemplary network of hardware devices;

FIG. 2 is a schematic representation of a memory having the components of the present invention;

FIG. 3 is an overview of the planning process of the present invention;

FIG. 4 is a flowchart of the job-ranking process;

FIG. 5 is a flowchart of the job-pickiness evaluation process;

FIG. 6 is a flowchart of the job-network-centricity evaluation process;

FIG. 7 is a flowchart of the resource assignment process; and

FIG. 8 is a flowchart of the schedule optimization process.

DETAILED DESCRIPTION OF THE PREFERRED EMBODIMENT

As is well-known in the computing arts, there are often a variety of means for implementing any given processing function. In particular, most processing may be implemented with computer hardware, computer software, or any combination thereof. Likewise, the principles of the present invention are applicable to a variety of computer hardware and software configurations, and the means for implementing any given function described below, whether hardware or software, are illustrative only. From this description, any person of ordinary skill in the computing arts may readily develop equivalent combinations of hardware and software that perform identical functions.

The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Jobstream Planner" program.

Means for enabling an operator to interact with such a computer program are well-known in the art. The particular means for enabling an operator to enter or view data are of little significance to the novelty of the present invention, and generally are not described in detail here. Thus, for the purposes of describing a preferred embodiment, and unless otherwise indicated, the inventive computer program interacts with an operator through conventional means, such as keyboards, mice, video monitors, input files, dialog boxes, voice recognition, or the like, although a person of ordinary skill in the art may readily recognize additional hardware, software, or any combination thereof that performs the identical function.

Additionally, the Jobstream Planner (JSP) is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

JSP 200 typically is stored in a memory, represented schematically as memory 220 in FIG. 2. The term "memory," as used herein, includes without limitation any volatile or persistent medium or computer-readable storage device, such as an electrical circuit, magnetic disk, or optical disk, in which a computer can store data or software for any duration. The term "computer-readable storage device" does not encompass a signal propagation media. A single memory may encompass and be distributed across a plurality of media. Thus, FIG. 2 is included merely as a descriptive expedient and does not necessarily reflect any particular physical embodiment of memory 220. As depicted in FIG. 2, though, memory 220 may include additional data and programs. Of particular import to JSP 200, memory 220 may include a job descriptor file 230, which is described in greater detail below.

FIG. 3 provides an overview of the planning process of the present invention. In the preferred embodiment, the tasks of the planning process are distributed among administrators, users, and JSP 200. In general, a user submits a job along with a job descriptor file 230. Job descriptor file 230 is preferably an Extensible Markup Language (XML) file that describes a job's attributes, such as the estimated number of instructions that the job must execute and the time by which the job should execute. One or more administrators must then develop a base plan, which requires the administrator to build a job-dependency tree (310), rank each job (320), assign resources to each job (330), schedule each job to execute by the time requested in each job's job descriptor file 230 (340). Each of these tasks is described in greater detail below. JSP 200 then optimizes the schedule so that each job executes as early as possible (350). JSP 200 also integrates ad-hoc jobs into the schedule as needed (360). The optimization and integration processes also are described in greater detail below.

Many jobs must execute in a prescribed sequence, usually because one job uses the output of another job as input. Thus, some jobs necessarily must wait for other jobs to complete before executing. Thus, one of an administrator's first tasks is to build a job-dependency tree (310). A job-dependency tree is a tree data structure wherein each node represents a job. Within the tree, each root node represents an independent job, and each node below a root node represents a dependent job. Here, the term "independent job" refers to any job that may execute without waiting on another job. Conversely, the term "dependent job" is any job that is contingent upon another job and must wait for the other job to complete before executing.

After building a job-dependency tree (310), an administrator ranks each job (320), as illustrated in FIG. 4. To rank each job, the administrator first identifies all "plannable" jobs (410). A "plannable" job is either an independent job or a dependent job whose prerequisite jobs already have been scheduled. The administrator then ranks the plannable jobs according to the job's priority (420), pickiness (430), and "network centricity" (440). The user specifies a weight for each of these factors, and the administrator multiplies each factor by the specified weight (450). The administrator then adds the products together to produce a job rank (460), assigns resources (330) for the highest ranked job, updates the list of plannable jobs (410), and repeats the process until all jobs have been ranked.

A job's "pickiness" is any value that reflects the fungibility the resources that a job requires to execute properly. As FIG. 5 illustrates, to evaluate a job's "pickiness" (430), an administrator first estimates the job's "runtime," which is the time required to execute the job and all prerequisite jobs, considering the average speed of all available machines (510). The administrator then determines the job's time frame (520), which is bounded by the job's earliest possible start time and latest possible start time. The earliest possible start time is an estimate of the time at which all the job's prerequisite jobs will complete. The latest possible start time is the difference between the job's runtime and the job's user-specified deadline. Finally, the administrator determines the number of machines that have sufficient capacity and the requisite software to execute the job within the job's time frame (530), and then divides this number by the total number of available machines (540) to produce the pickiness factor.

FIG. 6 illustrates the process of evaluating a job's network centricity (440), with reference to exemplary network 100. A job's network centricity indicates the probability that the job will transfer data over a heavily used communications link between nodes in a network. To determine a job's network centricity in network 100, the administrator first analyzes network 100 to determine the preferred link between each pair of nodes in the network (610). Generally, the administrator uses benchmark tests to measure each link's bandwidth, and the preferred link is the link providing the maximum bandwidth between each pair of nodes. Communication between two arbitrary nodes may require the use of several links. To determine which links are more likely to be involved in some communication within the network, the administrator calculates a "tick value" for each link (620). To calculate each link's tick value, the administrator first uses commonly available network analysis tools (such as "trace route") to identify the typical path of links traversed between each pair of nodes, disregarding other alternative paths between the two nodes. The administrator then increments the tick value of each link in the typical path. After repeating this for all possible pairs of nodes, the links with the highest tick values represent links that are most likely to create a bottleneck in network communications. The administrator then identifies possible nodes that could execute the job (630). For each node in the list, the administrator identifies any remote nodes to which or from which the execution node must transfer data (640), and calculates the data transfer time between each possible execution node and each remote node (645). The data transfer time is equal to the estimated amount of transferred data divided by the bandwidth of the preferred path. The data transfer times then are added to be used as the data time metric. The maximum tick value of any link in the paths between the execution nodes and the remote nodes is used as the tick metric. The time metric and the tick metric then are multiplied, and the product is recorded for each execution node. The average over all calculated metrics for the possible execution nodes is the job's network centricity value (650).

FIG. 7 illustrates the process of assigning resources to jobs (330). As described herein, the process treats enterprise computing resources as a grid of resources, which provides greater flexibility in assigning resources to jobs. Grid computing, though, is an emerging technology and can mean different things to different people. See, generally, International Business Machines Corp., *New to Grid Computing*. But as used here, the concept of "grid computing" refers to a united pool of servers, storage systems, and networks in a single large system that can deliver the power of multiple-systems resources to a single user point for a specific purpose. Id. To a user, datafile, or an application, the system appears to be a single, enormous virtual computing system. Id. As FIG. 7 illustrates, to assign resources for a job (330), an administrator first calculates a job's total execution time (710), which is equal to the sum of the predicted data transfer time and the predicted computation time. The total execution time and the job's network centricity then are added (720) and compared with all the possible execution nodes (730). The node having the best combined metric then is earmarked, and the earliest start time is determined based on the predicted utilization of the resource and the network path that will be used for data transfer.

After resources have been assigned (330), JSP 200 optimizes the schedule (350) by evaluating the schedule's "fitness," which is equal to the sum of each job's fitness. FIG. 8 illustrates JSP optimization process (350) in greater detail. To determine a job's fitness, JSP 200 first gives the job a fitness value of zero and initializes counter "i" (810). Then, JSP 200 subtracts a job-dependent amount from the fitness value (820). This job-dependent amount is equal to the job priority multiplied by a weight specified by the user. For every deadline met, JSP 200 adds a value that is proportional to the time remaining between the predicted end of execution and the job deadline and the job priority (830). This value also is weighted according to user preferences. For every link over which a job transfers data, JSP 200 subtracts a penalty that is proportional to the number of ticks for that link (840). The precise penalty is not critical to the discussion, though, as the penalty can be configured by the user or the administrator to meet the needs of any given implementation. JSP 200 then adds a performance bonus amount for each preferred job trait that the schedule satisfies or exceeds (850), such as where the user has indicated that the job needs at least 256 megabytes of memory. Again, the precise bonus amount is not critical to the discussion, as the bonus amount can be configured by the user or the administrator to meet the needs of any given implementation. The bonus amount also is weighted according to user preferences. JSP 200 then subtracts a balance penalty for every over-utilized resource, if there is another resource that is under-utilized (860). Here, over- and under-utilization is measured by user-defined bounds and/or deviations from historical utilization. Finally, JSP 200 subtracts a load penalty for every resource that is running more than one job at the same time (870), if there would be a commensurate slowing down of the multiple jobs due to running on the same resource. This penalty also is weighted according to user preferences.

JSP 200 then randomly selects N job pairs from the ranked job list with some bias toward selecting jobs closer to the top of the list and, for the first iteration (where i=0), stores the fitness value as an intermediate variable "X," resets the fitness value to zero, and increments counter i (880). JSP 200 then switches the assigned resources between job pairs (885), and evaluates modified schedule's fitness (820-870). If the schedule fitness does not improve, then JSP 200 restores the original resource assignment (890). Otherwise, the modified resource assignment replaces the original (895). Additionally or alternatively, if the jobs have been scheduled to run concurrently, JSP 200 then schedules the jobs to run serially and again evaluates the modified schedule's fitness (820-870). If the schedule's fitness does not improve, then JSP 200 restores the concurrent schedule. Otherwise, the serial schedule replaces the concurrent schedule. JSP 200 continuously repeats this process of switching resources and timing and re-evaluating the modified schedule's fitness for the next N pair of jobs in the ranked list, as time permits.

JSP 200 also monitors each assigned node to ensure that the node is in the predicted state at the time a job is scheduled to execute. If the node is in the predicted state, JSP 200 notifies an external application to execute the job. If the node is not in the predicted state, JSP 200 adds the job to the list of jobs that the administrator must schedule.

Finally, JSP 200 continuously accepts ad hoc jobs in real time after the original schedule is implemented. Each ad hoc job is ranked, as described above, and the modified schedule's fitness is re-evaluated. If the schedule's fitness drops below a given threshold, then JSP 200 forces the entire planning process to repeat.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method for scheduling multiple jobs in a digital data processing system based in part on available computer resources in the digital data processing system, the method comprising the steps of:
   receiving, by one or more processors, a schedule of jobs that ranks each job, assigns computer resources to each job, and schedules each job to execute by a user-requested time, wherein assignment of the computer resources is based at least on:
   a priority of each job;
   a fungibility of the computer resources that each job requires to execute properly;
   a probability that the job will transfer data over an over-loaded communications link between nodes in a network, the probability based at least on:
      a first value corresponding to a data transfer time between a pair of nodes in the network; and
   optimizing the schedule of jobs.

2. The method of claim 1, wherein the optimizing of the schedule is based at least on:
   the job priority;
   a second value, for each user-requested time met, that is proportional to a time remaining between a predicted end of execution, the user-requested time met, and the job priority;
   a third value corresponding to each preferred trait of a job that the schedule satisfies;
   a fourth value corresponding to an over-utilized resource, when another resource is under-utilized; and
   a fifth value corresponding to running more than one job at the same time on a same computer resource, when there would be a commensurate slowing down of the multiple jobs due to the running more than one job at the same time on the same resource.

3. The method of claim 2, wherein the optimizing further comprises the steps of:
   evaluating the schedule's fitness;
   switching resources assigned to a first job and a second job;
   re-evaluating the schedule's fitness with the resources switched;
   comparing the schedule's fitness with the resources switched and the schedule's fitness before switching resources; and
   retaining the assignment of resources that produces the best schedule fitness.

4. The method of claim 3, wherein the optimizing further comprises the steps of:
   assigning an initial value to the job's fitness;
   multiplying the job's priority by a user-specified weight and subtracting the resulting product from the initial value;
   adding a value to the resulting product that is proportional to the time between the predicted end of the job's execution and the job's deadline; and
   subtracting a value from the resulting sum that is proportional to the tick value of the preferred path between the machine assigned to execute the job and any remote machine with which the job must exchange data.

5. The method of claim 1, wherein the fungibility of resources required for the job is based at least on:
   estimating the job's runtime;
   determining the job's time frame;
   determining the number of machines in the digital data processing system that have sufficient capacity to execute the job within the job's time frame; and
   dividing the number of machines that have sufficient capacity by the total number of machines in the digital data processing system.

6. The method of claim 1, wherein the probability that the job will transfer data over an over-loaded communications link is based at least on:
   determining the preferred path between each pair of machines in the digital data processing system;
   determining the maximum bandwidth of each preferred path;
   determining the tick value of each preferred path;
   identifying each machine that could execute the job;
   calculating the data transfer time between each machine that could execute the job and any remote machine with which the job must exchange data;
   multiplying the result of the previous step by the maximum tick value of any preferred path; and
   averaging the result of the previous step for all machines that could execute the job.

7. The method of claim 1, wherein the assigning of the computer resources is based at least on:
   calculating the job's total execution time on each machine that could execute the job;
   adding the job's total execution time on each machine that could execute the job and the job's probability that the job will transfer data over an over-loaded communications link; and
   assigning the job to the machine on which the previous step produces the highest value.

8. The method of claim 1, wherein the optimizing further comprises the steps of:
   evaluating the schedule's fitness;
   switching resources assigned to a first job and a second job;
   re-evaluating the schedule's fitness with the resources switched;
   comparing the schedule's fitness with the resources switched and the schedule's fitness before switching resources; and
   retaining the assignment of resources that produces the best schedule fitness.

9. The method of claim 1,
   wherein the probability is further based at least on a count corresponding to a number of paths between nodes in a network that use the over-loaded communications link; and
   wherein the optimizing is further based at least on the count.

10. A computer program product for scheduling multiple jobs in a digital data processing system based in part on available computer resources in the digital data processing system, the computer program product comprising:
one or more computer-readable storage devices and program instructions stored on at least one of the one or more storage devices, the program instructions comprising:
program instructions to receive, by one or more processors, a schedule of jobs that ranks each job, assigns computer resources to each job, and schedules each job to execute by a user-requested time, wherein assignment of the computer resources is based at least on:
a priority of each job;
a fungibility of the computer resources that each job requires to execute properly;
a probability that the job will transfer data over an over-loaded communications link between nodes in a network, the probability based at least on:
a first value corresponding to a data transfer time between a pair of nodes in the network; and
program instructions to optimize the schedule of jobs.

11. The computer program product of claim 10, wherein the program instructions to optimize the schedule optimize the schedule based at least on:
the job priority;
a second value, for each user-requested time met, that is proportional to a time remaining between a predicted end of execution, the user-requested time met, and the job priority;
a third value corresponding to each preferred trait of a job that the schedule satisfies;
a fourth value corresponding to an over-utilized resource, when another resource is under-utilized; and
a fifth value corresponding to running more than one job at the same time on a same computer resource, when there would be a commensurate slowing down of the multiple jobs due to the running more than one job at the same time on the same resource.

12. The computer program product of claim 11, wherein the program instructions to optimize the schedule of jobs comprises:
program instructions to evaluate the schedule's fitness;
program instructions to switch resources assigned to a first job and a second job;
program instructions to re-evaluate the schedule's fitness with the resources switched;
program instructions to compare the schedule's fitness with the resources switched and the schedule's fitness before switching resources; and
program instructions to retain the assignment of resources that produces the best schedule fitness.

13. The computer program product of claim 12, wherein the program instructions to optimize the schedule of jobs comprises:
program instructions to assign an initial value to the job's fitness;
program instructions to multiply the job's priority by a user-specified weight and subtracting the resulting product from the initial value;
program instructions to add a value to the resulting product that is proportional to the time between the predicted end of the job's execution and the job's deadline; and
program instructions to subtract a value from the resulting sum that is proportional to the tick value of the preferred path between the machine assigned to execute the job and any remote machine with which the job must exchange data.

14. The computer program product of claim 10, wherein the fungibility of resources required for the job is based at least on:
estimating the job's runtime;
determining the job's time frame;
determining the number of machines in the digital data processing system that have sufficient capacity to execute the job within the job's time frame; and
dividing the number of machines that have sufficient capacity by the total number of machines in the digital data processing system.

15. The computer program product of claim 10, wherein the probability that the job will transfer data over an over-loaded communications link is based at least on:
determining the preferred path between each pair of machines in the digital data processing system;
determining the maximum bandwidth of each preferred path;
determining the tick value of each preferred path;
identifying each machine that could execute the job;
calculating the data transfer time between each machine that could execute the job and any remote machine with which the job must exchange data;
multiplying the result of the previous step by the maximum tick value of any preferred path; and
averaging the result of the previous step for all machines that could execute the job.

16. The computer program product of claim 10, wherein the assigning of the computer resources is based at least on:
calculating the job's total execution time on each machine that could execute the job;
adding the job's total execution time on each machine that could execute the job and the job's probability that the job will transfer data over an over-loaded communications link; and
assigning the job to the machine on which the previous step produces the highest value.

17. The computer program product of claim 10, wherein the program instructions to optimize the schedule of jobs comprises:
program instructions to evaluate the schedule's fitness;
program instructions to switch resources assigned to a first job and a second job;
program instructions to re-evaluate the schedule's fitness with the resources switched;
program instructions to compare the schedule's fitness with the resources switched and the schedule's fitness before switching resources; and
program instructions to retain the assignment of resources that produces the best schedule fitness.

18. The computer program product of claim 10,
wherein the probability is further based at least on a count corresponding to a number of paths between nodes in a network that use the over-loaded communications link; and
wherein the optimizing is further based at least on the count.

19. A computer system for scheduling multiple jobs in a digital data processing system based in part on available computer resources in the digital data processing system, the computer system comprising:
one or more processors, one or more computer-readable memories, one or more computer-readable storage devices, and program instructions stored on at least one of the one or more storage devices for execution by at least one of the one or more processors via at least one of the one or more memories, the program instructions comprising:

program instructions to receive, by one or more processors, a schedule of jobs that ranks each job, assigns computer resources to each job, and schedules each job to execute by a user-requested time, wherein assignment of the computer resources is based at least on:
- a priority of each job;
- a fungibility of the computer resources that each job requires to execute properly;
- a probability that the job will transfer data over an over-loaded communications link between nodes in a network, the probability based at least on:
  - a first value corresponding to a data transfer time between a pair of nodes in the network; and
program instructions to optimize the schedule of jobs.

20. The computer system of claim 19, wherein the program instructions to optimize the schedule optimize the schedule based at least on:
- the job priority;
- a second value, for each user-requested time met, that is proportional to a time remaining between a predicted end of execution, the user-requested time met, and the job priority;
- a third value corresponding to each preferred trait of a job that the schedule satisfies;
- a fourth value corresponding to an over-utilized resource, when another resource is under-utilized; and
- a fifth value corresponding to running more than one job at the same time on a same computer resource, when there would be a commensurate slowing down of the multiple jobs due to the running more than one job at the same time on the same resource.

21. The computer system of claim 20, wherein the program instructions to optimize the schedule of jobs comprises:
- program instructions to evaluate the schedule's fitness;
- program instructions to switch resources assigned to a first job and a second job;
- program instructions to re-evaluate the schedule's fitness with the resources switched;
- program instructions to compare the schedule's fitness with the resources switched and the schedule's fitness before switching resources; and
- program instructions to retain the assignment of resources that produces the best schedule fitness.

22. The computer system of claim 21, wherein the program instructions to optimize the schedule of jobs comprises:
- program instructions to assign an initial value to the job's fitness;
- program instructions to multiply the job's priority by a user-specified weight and subtracting the resulting product from the initial value;
- program instructions to add a value to the resulting product that is proportional to the time between the predicted end of the job's execution and the job's deadline; and
- program instructions to subtract a value from the resulting sum that is proportional to the tick value of the preferred path between the machine assigned to execute the job and any remote machine with which the job must exchange data.

23. The computer system of claim 19, wherein the fungibility of resources required for the job is based at least on:
- estimating the job's runtime;
- determining the job's time frame;
- determining the number of machines in the digital data processing system that have sufficient capacity to execute the job within the job's time frame; and
- dividing the number of machines that have sufficient capacity by the total number of machines in the digital data processing system.

24. The computer system of claim 19, wherein the probability that the job will transfer data over an over-loaded communications link is based at least on:
- determining the preferred path between each pair of machines in the digital data processing system;
- determining the maximum bandwidth of each preferred path;
- determining the tick value of each preferred path;
- identifying each machine that could execute the job;
- calculating the data transfer time between each machine that could execute the job and any remote machine with which the job must exchange data;
- multiplying the result of the previous step by the maximum tick value of any preferred path; and
- averaging the result of the previous step for all machines that could execute the job.

25. The computer system of claim 19, wherein the assigning of the computer resources is based at least on:
- calculating the job's total execution time on each machine that could execute the job;
- adding the job's total execution time on each machine that could execute the job and the job's probability that the job will transfer data over an over-loaded communications link; and
- assigning the job to the machine on which the previous step produces the highest value.

26. The computer system of claim 19, wherein the program instructions to optimize the schedule of jobs comprises:
- program instructions to evaluate the schedule's fitness;
- program instructions to switch resources assigned to a first job and a second job;
- program instructions to re-evaluate the schedule's fitness with the resources switched;
- program instructions to compare the schedule's fitness with the resources switched and the schedule's fitness before switching resources; and
- program instructions to retain the assignment of resources that produces the best schedule fitness.

27. The computer system of claim 19,
wherein the probability is further based at least on a count corresponding to a number of paths between nodes in a network that use the over-loaded communications link; and
wherein the optimizing is further based at least on the count.

* * * * *